United States Patent [19]

Simmons

[11] Patent Number: 5,555,177
[45] Date of Patent: Sep. 10, 1996

[54] METHOD AND APPARATUS FOR RESETTING INDIVIDUAL PROCESSES IN A CONTROL SYSTEM

[75] Inventor: Mark A. Simmons, San Jose, Calif.

[73] Assignee: Ontrak Systems, Inc., Milpitas, Calif.

[21] Appl. No.: 250,278

[22] Filed: May 27, 1994

[51] Int. Cl.⁶ ............................................. G06F 19/00
[52] U.S. Cl. ........................... 364/468.28; 134/902
[58] Field of Search ........................ 364/468; 134/902; 15/319

[56] References Cited

U.S. PATENT DOCUMENTS

| | | | |
|---|---|---|---|
| 4,208,760 | 6/1980 | Dexter et al. | 15/302 |
| 4,618,938 | 10/1986 | Sandland | 364/552 |
| 4,732,173 | 3/1988 | Czaja | 134/72 |
| 4,960,485 | 10/1990 | Ichinose et al. | 156/556 |
| 5,014,208 | 5/1991 | Wolfson | 364/468 |
| 5,081,733 | 1/1992 | Kudo | 15/77 |
| 5,216,613 | 6/1993 | Head, III | 364/468 |

*Primary Examiner*—Roy N. Envall, Jr.
*Assistant Examiner*—Steven R. Garland
*Attorney, Agent, or Firm*—Blakely, Sokoloff, Taylor & Zafman

[57] ABSTRACT

A method and apparatus for resetting a process in a control system. The steps in this method involve identifying a process for a portion of a double-sided wafer scrubber. Then, the process is reset.

16 Claims, 5 Drawing Sheets

METHOD AND APPARATUS FOR RESETTING INDIVIDUAL PROCESSES IN A CONTROL SYSTEM

NOTICE

©1994 OnTrak Systems, Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND OF THE INVENTION

1. Field of Invention

The present invention relates to the field of control system implementation. In particular, the present invention describes a method and apparatus for resetting a process in a control system.

2. Description of Related Art

Semiconductor manufacturers use semiconductor wafers as the base for manufacturing integrated circuits. In one step of the manufacturing process, the wafers are put through a chemical-mechanical polishing step that leaves the wafers' surfaces covered in particles. Semiconductor manufacturers use double-sided wafer scrubbers (scrubbers) to clean the semiconductor wafers after being polished. Double-sided wafer scrubbers clean both sides of each wafer to remove these particles.

To reduce the risk of damaging the wafers, automated scrubbers have been developed. Scrubbers typically include a number of automated stations that operate together to clean wafers. Typically, to clean a wafer, the wafer must first be loaded from the cassette (a device for holding wafers), washed, brushed, dried, and then placed into another cassette. Typically, a scrubber cleans multiple wafers at the same time; one wafer being in each station. On occasion, one of the stations in the cleaning process will fail. Typically, a failure can occur because of a human operator (operator) error, a power surge, or a sensor failure. Although these types of failures occur rarely, the loss of one wafer can be very expensive. Therefore, some scrubbers have attempted to provide mechanisms for recovering from a failure during the cleaning process.

One system, the DDS200™ scrubber, available from OnTrak Systems, Inc., of Milpitas, Calif., allows the operator to shutdown the scrubber and then restart the cleaning process. However, this means that the entire machine is powered off and power is lost at each station. This may cause, for example, water, chemicals, and air to stop flowing. While the machine is shutdown, the possibility exists that a wafer will dry before being completely cleaned. Once a wafer dries, it cannot be cleaned, and the wafer will be lost.

SUMMARY OF THE INVENTION

A method and apparatus for resetting a process in a control system is described. One embodiment of the present invention includes a method having the following steps. First, identify a process for a portion of a double-sided wafer scrubber. Then, reset that process. This allows other portions of the double-sided wafer scrubber to continue operating without the need to shut down the entire scrubber.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW

A method and apparatus for resetting a process in a control system is described. In the following description, numerous specific details are set forth such module structure, process communications, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

In the following description, a scrubber, in which one embodiment of the present invention may operate, is presented. The scrubber includes a number of stations that work together to perform the task of cleaning wafers. The control system used to operate the scrubber is then presented. The control system includes a number of processes that control portions of the scrubber. If an error occurs at one of the stations, the control system can reset that station without having to reset the entire scrubber. One of the ways this is accomplished is to stop the process running the station with the error. Then, a new process is started for that station. This allows the controller to reset one process, while allowing the other processes to continue. Resetting only specific processes reduces the risk of a wafer being damaged because of a complete scrubber shutdown.

SCRUBBER

Figure 1:
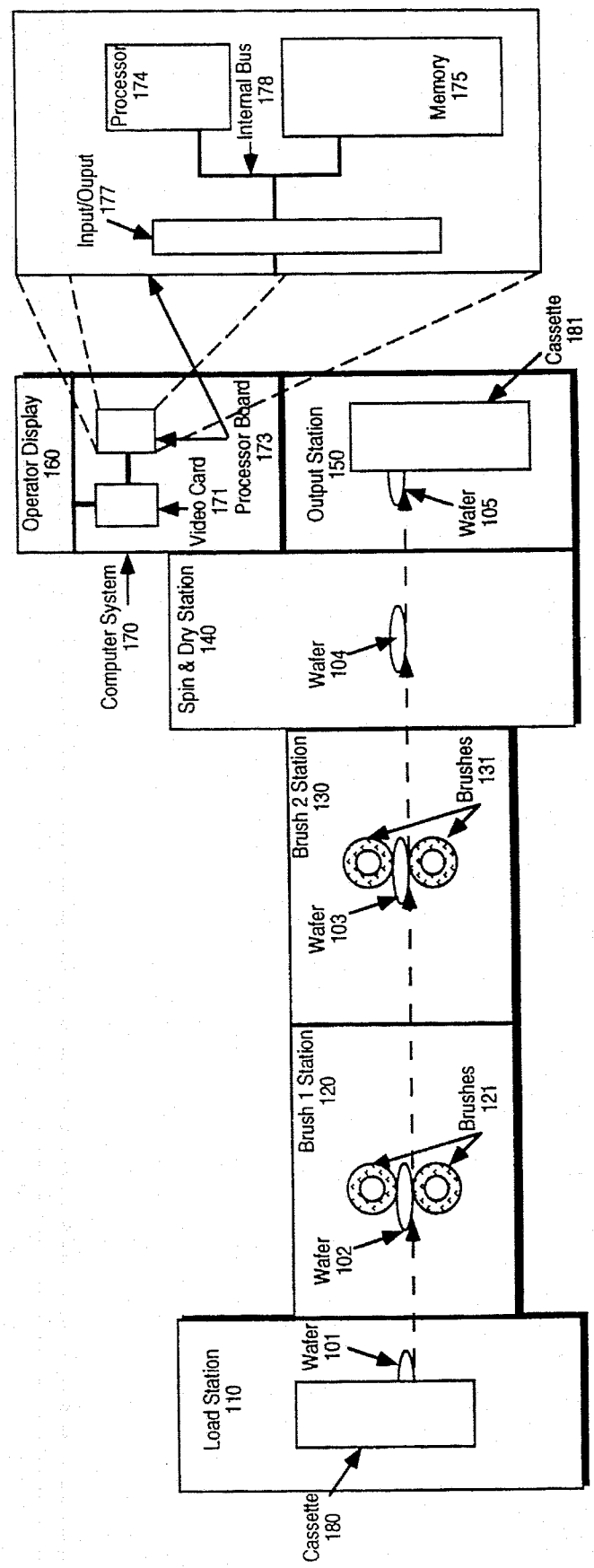
FIG. 1 illustrates a view of a double-sided wafer scrubber.

FIG. 1 illustrates a view of a double-sided wafer scrubber (scrubber) as may be used by one embodiment of the present invention. The scrubber includes a number of stations. Each of theses stations logically represent one or more steps in the wafer cleaning process. These stations can also include the hardware and software that completes one of the steps in the cleaning process. The cleaning process includes the steps executed by the scrubber on the wafers.

Dirty wafers are loaded at one end of the scrubber; clean wafers are unloaded from the other end of the scrubber. An example of a scrubber of this type can be obtained from OnTrak Systems, Inc. of Milpitas, Calif., the DDS200™ scrubber.

In load station 110 (also known as the input station), the operator loads a cassette 180 into the scrubber. The cassette 180 contains a number of dirty wafers. Wafers are automatically removed from load station 110 to brush 1 station 120. Wafer 101 represents a dirty wafer being automatically removed from cassette 180.

In brush 1 station 120, a dirty wafer 102, is brushed and sprayed (water jets not shown), to remove some of the particles from the dirty wafer 102. Brushes 121 scrub both sides of the dirty wafer 102. The once brushed wafers are then automatically moved to brush 2 station 130. In brush 2 station 130, a once brushed wafer 103 is brushed and sprayed (water jets not shown), to remove more of the particles from the once brushed wafer 103. Brushes 131 scrub both sides of the once brushed wafer 103. The twice brushed wafers are then automatically moved to spin & dry station 140.

Spin & dry station 140 rinses the wafers, spins them, and dries them. Wafer 104 represents a wafer being processed in the spin & dry station 140. At this point, the wafer has been cleaned. Note, for one particular type of wafer, the wafer must have been kept wet during the load station 110, brush 1 station 120, and brush 2 station 130. Only after being brushed and rinsed can this type of wafer then be spun and dried. The spun and dried wafer is then moved to the output station 150.

In output station 150, the clean wafer is put into a cassette 181. Wafer 105 represents a clean wafer being put into cassette 181. The cassette 181, full of clean wafers, can then be removed by the operator. This completes the cleaning process.

Computer system 170 controls the operation of the various stations in the scrubber. Computer system 170 typically includes a processor board 173. Processor board 173 includes a processor 174 and memory 175. The processor 174 communicates with the memory 175 via an internal bus 178. The processor 174 communicates with an input/output circuit 177. The input/output circuit 177 allows the processor 174 to communicate with the stations and with a video card 171. The video card 171 generates a video signal for the operator display 160. Operator display 160 typically includes a monitor like a cathode ray tube, or flat panel display. In one embodiment, operator display 160 also includes a touch sensitive screen allowing the operator to interact with the computer system 170.

The processor 174 executes programs, stored in the memory 175, to control the stations. The memory and the processor can be purchased as standard parts. For example, processor board 173 can include a processor board from Gespac, Inc., of Scottsdale Ariz. (a Motorola 68000 based processor board, part number SBS6A). The memory 175 can include 2 Mbytes of random access memory (RAM) for data and code, and a 256K EPROM, for code. A typical video card 171 can also be purchased from Gespac, Inc. (part number VIG-4W).

In one embodiment, the scrubber can process multiple wafers simultaneously; one or more wafers are being processed in each of the stations at a point in time.

Note that the above described computer system 170 is but one embodiment and one of ordinary skill in the art would understand that other embodiments are possible.

CONTROL SYSTEM

One embodiment of the control system of the present invention controls each of the stations in the cleaning process. The control system communicates with motors, water jets, conveyors, drying lamps, etc. in each station to perform the cleaning process.

In one embodiment of the present invention, the OS-9 operating system is used in the control system. OS-9 can be obtained from Microware Systems Corporation, Des Moines, Iowa. Specific information on OS-9 can be found in Dibble, P. C. *OS-9 Insights: An Advanced Programmers Guide to OS-9, 2nd Edition*, Des Moines, Iowa, Microware Systems Corporation, 1992; and in, *OS-9 Training and Education Manual: Intermediate OS-9 Topics*, Des Moines, Iowa, Microware Systems Corporation, 1992. Other operating systems can be used (for example, Unix, Dos) that support signaling mechanisms and mechanisms for scheduling tasks.

OS-9 is a multi-tasking operating system. OS-9 allows two, or more, independent programs, called processes or tasks, to execute simultaneously. OS-9 supports re-entrant program code. That means that the code is not self modifying. This allows two or more different processes to share one copy of some program code simultaneously. The processes do not usually affect each other.

The OS-9 kernel provides basic system services, like I/O management, process control, and resource management.

Programs, like the control system for the scrubber, are made from a number of modules. Each module is a logical, self-contained program code, program code segment, or collection of data. Each module includes a module header, a module body, and a CRC (Cyclic Redundancy Check) value. The module header includes a module's name, size, type, and language. The module body includes initialization data, program instructions, constant tables, etc. The CRC is three bytes used to verify the module's integrity.

There are typically two types of modules: executable modules and data modules. The executable module is a module containing program code. Typical executable modules include initialization routines, interrupt routines, and a main loop. In one embodiment of the present invention, a typical initialization routine initializes all the parts of a scrubber station. For example, the initialization routine for the brush 1 station 120 resets the brush motors and water jets. The interrupt routines are used to process interrupt signals (discussed in more detail later). The main loop typically includes all the steps needed to perform the tasks for one part of the cleaning process. A data module is a module that enables multiple processes to share a data area and to communicate data among themselves.

An OS-9 process is an executing program. The process is typically started with a fork system call. The fork system call must be sent the name of the executable module that the new process is to execute. Each process is represented by a process descriptor. Each process descriptor includes: state, memory allocation, priority, I/O paths, etc.

Once created, a process has a state. The state can be active, waiting, or sleeping. Active means that the process wants processor time. Waiting means that the process will wait for another process to stop, or until the process receives a signal. Sleeping means that the process will wait for a specified time period or until a signal is received.

New processes are placed in a process queue. The process queue is used by the operating system to determine the state of a process. The queue contains a linked list of process descriptors.

Processes can communicate information among themselves using signals. A signal is an intentional disturbance in the system (also referred to as software interrupts). One process can send a numbered interrupt signal to another process. In a scrubber, for example, a scheduler process sends signals to station processes to perform tasks. When a station process receives the signal, the station process will often execute its interrupt routines to perform the task.

Figure 2:
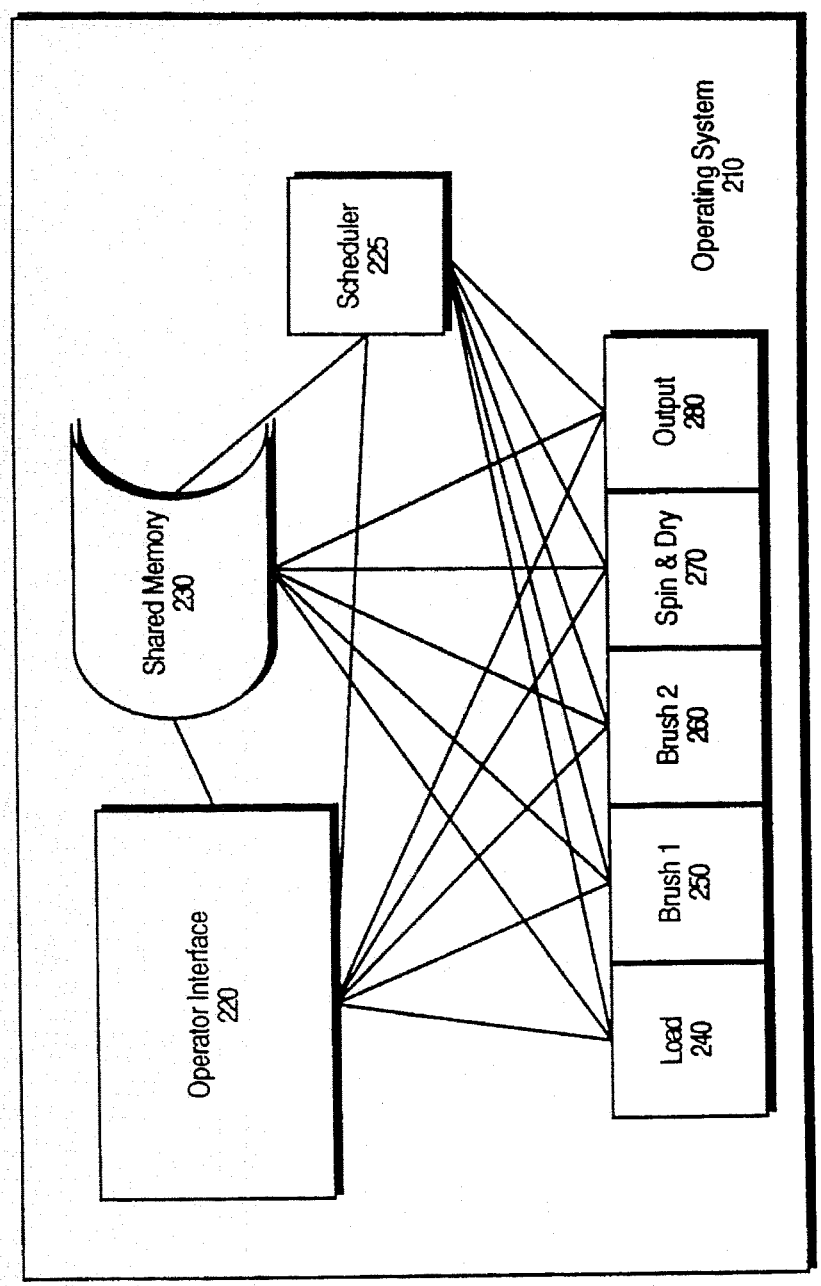
FIG. 2 is a control system view of a double-sided wafer scrubber.

FIG. 2 illustrates a control system that may be used in the scrubber of FIG. 1. The control system is implemented on top of operating system 210. In one embodiment, operating system 210 is the OS-9 operating system. The control system includes a number of process.

The first process used in the control system is an operator interface 220. Operator interface 220 is a process used by the operator to control the scrubber. The operator interface 220 presents display information for operator display 160, starts a scheduler 225, and starts a number of station processes.

The scheduler 225 is a process that is used during the normal operation of the scrubber. The scheduler 225 schedules signals to be sent to the station processes. This allows each station process to perform some specific task related to that particular station.

Load 240 is a station process that controls the operation of the load station 110. One of the more important features of the load 240 is that it ensures that wafers are accessed from the cassette at the correct time. For example, load 240 ensures that wafer 101 is transferred from cassette 180 at the correct time for brush 1 station 120 to accept the wafer.

Brush 1 250 is a station process that controls brush 1 station 120. Brush 1 250 causes the brushes 121 to brush and to rotate the dirty wafer 102. Therefore, brush 1 250 must control brush motors and motors used to rotate the wafer.

Brush 2 260 is a station process that controls brush 2 station 130. Brush 2 station 130 operates in a manner similar to brush 1 250.

Spin & dry 270 is a station process that controls spin & dry station 140. Spin & dry 270 ensures that wafer 104 is first rinsed, spun, and then dried.

Output 280 is a station process that controls output station 150. Output 280 ensures that wafer 105 is load properly into cassette 181.

Each of the station processes share data with the operator interface 220 and the scheduler 225 using shared memory 230. Typically, shared memory 230 is a data module that is loaded like the other modules. The other processes link to the shared memory 230. In one embodiment, the other processes have direct access to the data held in shared memory 230. The data stored in memory 230 is discussed in greater detail below.

STARTING A PROCESS

Figure 3:
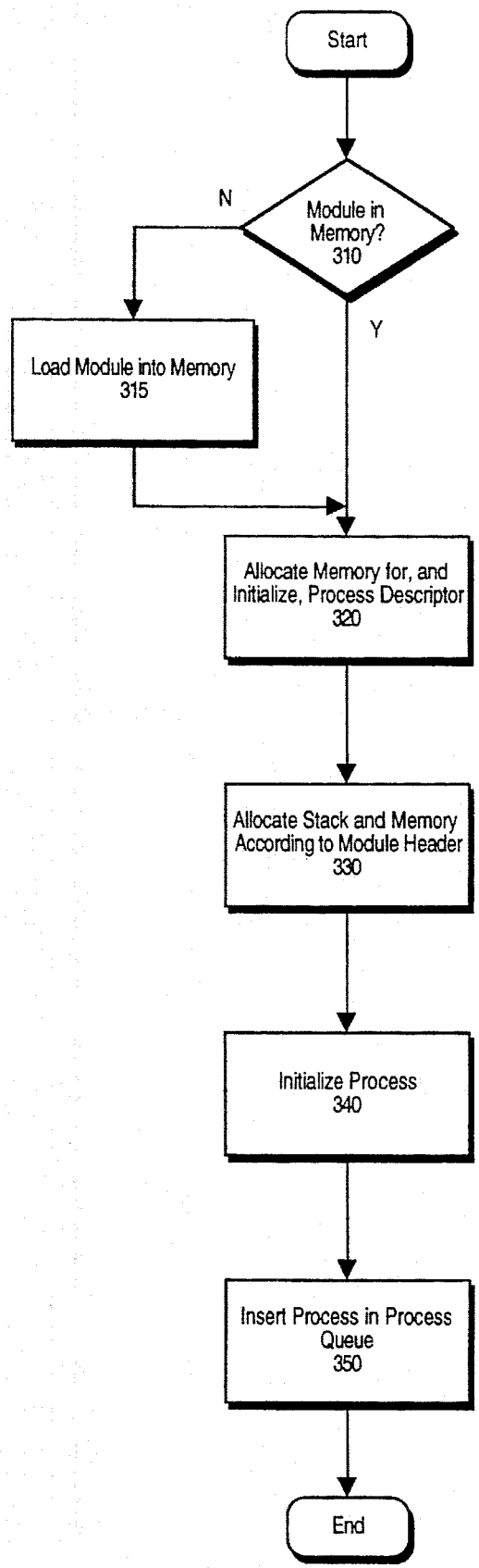
FIG. 3 is a flowchart of how to start processes in the OS-9 operating system.

The following discusses how processes may be started in an operating system such as OS-9. FIG. 3 is a flowchart of how to start processes in the OS-9 operating system. This may happen, for example, when one process uses a fork system call to start another process. At 310, the operating system determines whether the particular module is in memory. If the module is not in memory, then, at 315, the module is loaded. At 320, the operating system allocates memory for the process descriptor of the new process. The operating system also initializes the process descriptor. At 330, the operating system allocates stack space and other memory for the process according to the module's header.

At 340, the process is initialized. Typically, this includes calling the initialization routines for the new process.

At 350, the operating system places the process into the process queue. This allows the process to have processor time from processor 174. That is, the new process is ready to begin execution on processor 174.

SCRUBBER START UP

Figure 4:
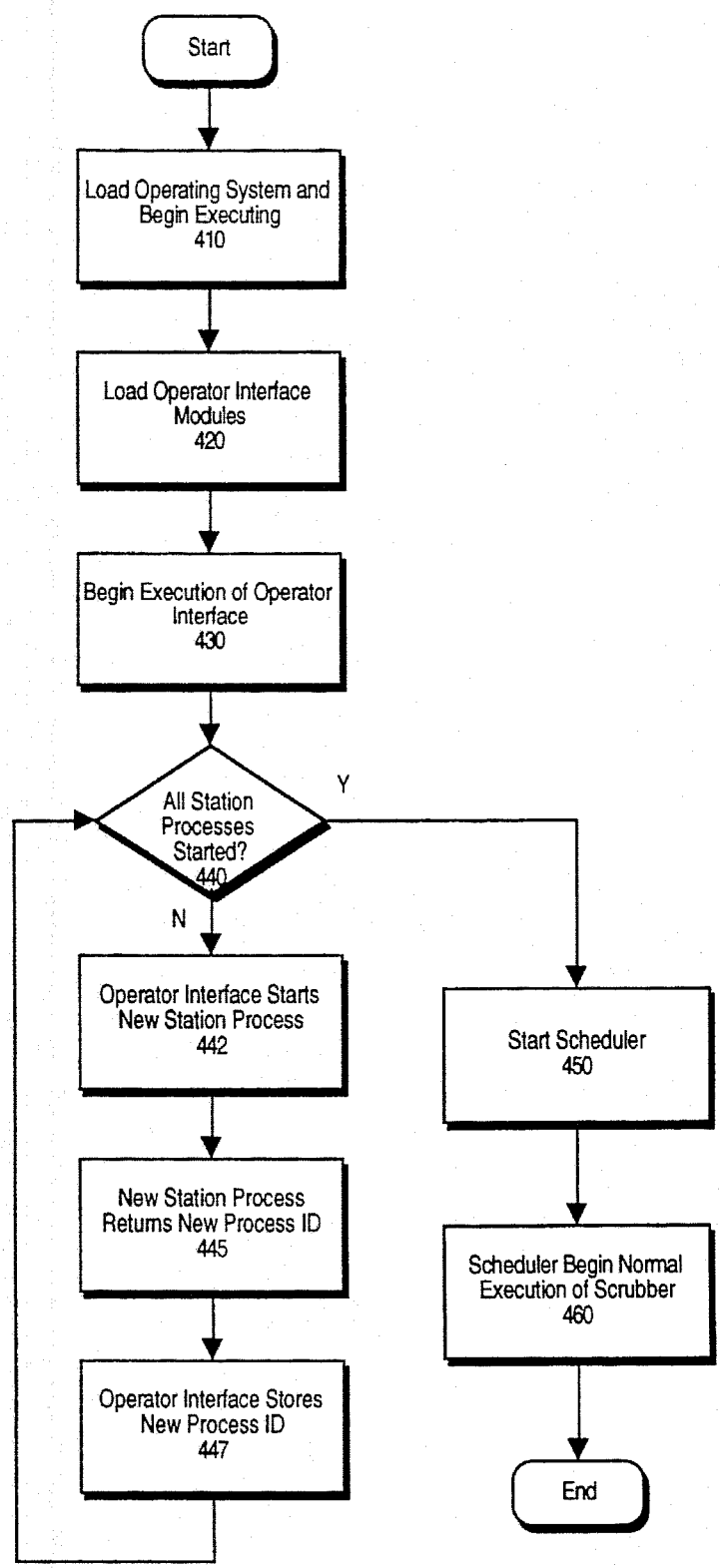
FIG. 4 is a flowchart of how a double-sided wafer scrubber is started.

FIG. 4 illustrates how a scrubber is started. Generally, the processor 174 initializes the operating system, loads the necessary control system modules, and then begins executing processes.

At 410, the operating system is loaded and begins executing. Typically, the operating system is stored on EPROMs on the processor board 173.

Next, at 420, the operating system loads the operator interface module(s). In one embodiment of the present invention, multiple modules are used to start the operator interface. In another embodiment, the operator interface is started from only one module. For the sake of simplicity, the following description assumes that the operator interface can be run from one operator interface module.

At 430, the operator interface is started using the loaded operator interface module. Starting the operator interface generally follows the operations of starting a process as described in relation to FIG. 3.

At 440, the operator interface determines whether all the necessary station processes have been started. Typically, the station processes started are: the scheduler 225, the load 240, the brush 1 250, the brush 2 260, the spin & dry 270, and the output 280.

If not all the processes are started, then steps 442, 445 and 447 are executed. At 442, the operator interface starts a new station process (for example, load 240). Typically, this is done by making a fork system call. At 445, the new station process returns a process ID. The process ID identifies the process to the operating system and other processes. The process ID can be used to send signals to a given process. At 447, the operator interface stores the process ID in shared memory 230. By storing the process IDs in the shared memory 230, the operator interface 220 always knows what station processes are presently executing. Storing the process ID is important, in one embodiment of the present invention, so that a process can be reset.

Next the check at 440 is executed again. Once all the station processes have been started, at 450, the operator interface starts the scheduler 225. At 460, the scheduler 225 begins normal execution of the scrubber. As mentioned above, the scheduler 225 can control the station processes by sending signals to the other processes. For example, scheduler 225 can send a signal to brush 1 250 to begin processing of a dirty wafer 102.

Therefore, the scrubber can begin the cleaning process on a number of wafers.

RESETTING A PROCESS

In one embodiment of the present invention, processes are reset by having the operator interface transmit a signal to a target process to stop executing. The operator interface then starts a new process from the same executable module. The new process typically begins executing from the start of the initialization routines, possibly repeating a portion of the last cleaning step. The other processes do not know that anything else happened; they continue processing. That is, they continue processing rather than shutting down, as in a complete scrubber shutdown; thereby, reducing the risk of wafers drying out, or other wafer damage.

Figure 5:
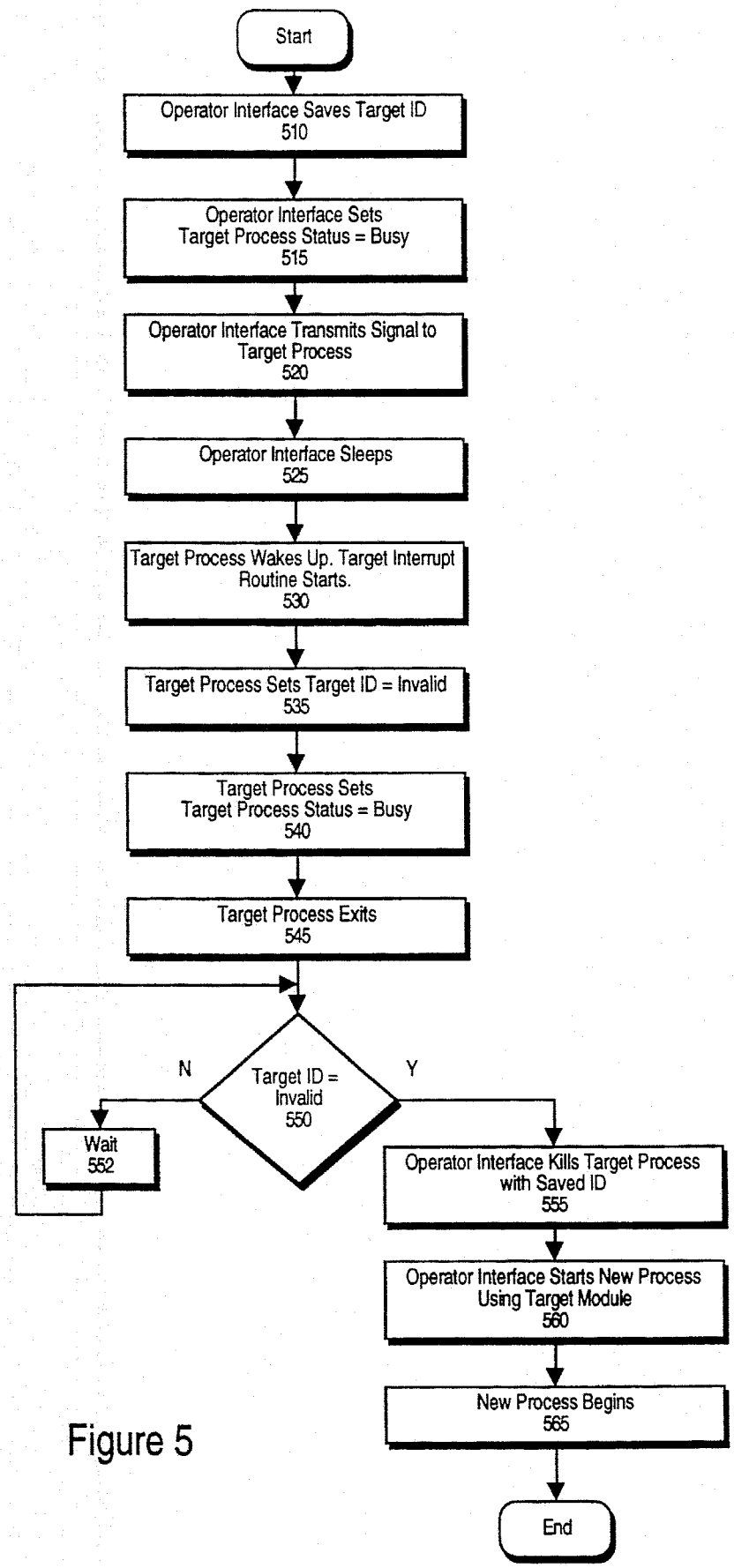
FIG. 5 is a flowchart of a how a double-sided wafer scrubber process is reset.

FIG. 5 is a flowchart of a how a scrubber process can be reset. For the purposes of describing this flowchart, assume that an error has occurred in one of the stations in a scrubber. The operator does not want to shut the entire system down, she merely wants to reset the process. Using the operator interface, she can cause the processes associated with one station to reset without the other stations stopping processing. Assume that the operator has interacted with the operator interface through operator display 160. The operator has identified, to the operator interface, which station has the error and should be reset. This gives the operator interface a target process to reset. Of course, given the description herein, one of ordinary skill in the art would understand that multiple processes can be reset by following the general steps outlined herein.

At 510, the operator interface saves the process ID of the target process (target ID). The target ID is found by the operator interface in shared memory 230. This ID is typically saved in a local variable within the operator interface.

At 515, the operator interface sets the status of the target process to busy. Shared memory 230 includes a status for each station process. Note, this status is not necessarily the same as the process state, as described above. The status indicator stored in shared memory 230 indicates whether the process is busy or available. If the process is available, then scheduler 225, for example, can transmit signals to the target process. Therefore, having the operator interface set the target process's status to busy, stops the scheduler 225 from transmitting further signals to the target process.

At 520, the operator interface transmits a signal to the target process. In one embodiment, this signal includes a user defined value. When a station process receives this signal with this value, the process will stop executing.

At 525, the operator interface sleeps. Other processes will continue to execute on processor 174, including the target process.

At 530, the target process wakes up, assuming it was sleeping. Even if the target was not sleeping, the nature of the signal sent by the operator interface causes the target process's interrupt routines to begin executing.

At 535, the target process sets its target ID to an invalid value. This is done by setting the value in shared memory 230 representing the process ID of the target process to an invalid value (e.g. −1). This further ensures that other processes will not attempt to send signals to the target process. This type of redundancy is important in multitasking environments like the scrubber control system because one process cannot not be sure that another process will take the processor away from the first process. Setting the target process ID to an invalid value is also used as a flag for the operator interface.

At 540, the target process sets the target process status to busy. This has the same effect as step 515, however, this step is repeated as insurance.

At 545, the target process ceases execution. In one embodiment, the target process executes an exit system call. This causes the target process to stop executing and to free the memory allocated for the target process. Note, however, that the executable module associated with the target process is not effected.

At 550, the operator interface wakes up, and checks to determine whether the target ID has been set to an invalid value. This can be done by checking the value of the target ID stored in shared memory 230. If the target ID is not set to invalid, then the target process did not execute steps 530, 535, 540, and 545. Therefore, the operator interface will wait for a period of time, 552. The check is made again at 550. In one embodiment, the number of times the operator interface must check the target ID is counted. If this number exceeds a predetermined number (e.g. 200), then a error will be displayed.

Once the target ID has been detected as being invalid, at 555, the operator interface stops the execution of the target process using another signal. This signal is similar to signal transmitted in step 520. In one embodiment, a kill system call is sent to the target process. If the target process did not previously properly stop, this kill signal should stop the target process. Further, this signal ensures that all the memory associated with the target process has been freed.

At 560, the operator interface starts a new process using the target module. The steps executed are similar to those described in relation to FIG. 3. Note that in one embodiment of the present invention, modifications were made to the initialization routines for each of the station modules. The station modules were modified to ensure that all motors were turned off upon initialization. This is important so that a motor that is left on by the target process does not possibly cause some damage to any wafers in the station. The load module initialization routines, for example, ensure that a conveyor belt for transferring wafers from load station 110 to brush 1 station 120 is turned off.

At 565, the new process begins operating. Thus, the station can begin processing the wafer again while the other stations are allowed to continue their processing.

It will be clear to one of ordinary skill in the art that some of the steps of FIG. 5 can occur in an order other than is presented. For example, step 515 can be executed before step 510. It will also be clear to one of ordinary skill in the art that some steps may be omitted with only a marginal loss in system reliability. For example, step 540 can be omitted in one embodiment. Further, step 555 can be used in place of step 520, and step 555 need not be executed, in one embodiment.

A section below includes a portion of the program code used by the operator interface 220 to reset the brush 1 250. Another section below includes a portion of the interrupt program code used by the brush 1 250.

A method and apparatus for resetting a process in a control system has been described.

---

OPERATOR INTERFACE CODE

```
/********************reset brush1********************/
/* © 1994 Ontrak Systems, Inc.                       */
/* This function resets the brush 1 process.
int reset_brush1( )
{
int id;
unsigned short counter;
char *id_string[200];
data->brush1_status = 1;
id = data->brush1_id;
kill(data->brush1_id, 256);
tsleep(100);
counter = 0;
while (data->brush1_id != −1 && counter < 200)
  {
    tsleep(10);
    counter++;
  }
sprintf(id_string, "kill %d", id);
system(id_string);
tsleep(50);
counter = 0;
while (data->brush1_id == −1 && counter < 10)
```

```
                    OPERATOR INTERFACE CODE

{
    /* ensure that new process starts */
    data->brush1_id = os9fork("brush1",1,"\n",1,1,4,128);
    counter++;
    }
    }

BRUSH 1 CODE

/****************reset brush1****************/
    /* © 1994 Ontrak Systems, Inc.              */
    /* This function resets the brush 1 process.
    int reset_brush1(s)
    int s;
    {
    int id;
    unsigned short counter;
    char *id_string[200];
    data->brush1_sig = s;
    switch(s)
       {
       case 256:
          data->brush1_id = -1;
          data->brush1_status = 1; /*optional*/
          exit( );
          break;
       default:
          break;
       }
    data->brush1_sig = 0;
    }
```

What is claimed is:

1. A wafer processing system comprising:

a plurality of stations;

a processor being coupled in communications with said plurality of station, said processor controlling said plurality of station, said processor executing a plurality of processes that include a first process for resetting a second process of said plurality of processes, said second process controlling an operation of one of said plurality of stations, said processor transmitting a signal from said first process to said second process, wherein the processor starts a new process in response to the signal to replace said second process; and a memory for storing information for said plurality of processes, said memory being coupled in communications with said processor.

2. The wafer processing system of claim 1 wherein said memory is for storing an ID corresponding to said second process, said memory is further for storing a status value for said second process, and wherein said processor is further for setting said status value to busy, for terminating said second process using said ID and for starting a new process.

3. The wafer processing system of claim 2 wherein said memory is used for storing a second module, said second module corresponding to said second process, and wherein said processor uses said second module to start said second process.

4. The wafer processing system of claim 1 wherein said plurality of stations includes:

a loading station;

a brushing station;

a drying station; and an output station.

5. A device for resetting a process in a wafer processing system having a first station and a second station, said device comprising:

a memory for storing data associated with a plurality of processes;

a processor, being coupled to said memory, said processor executing a first process and a second process of said plurality of processes, said first process for controlling an operation of said first station, said first process having an error, said processor resetting said first process having said error while continuing to execute said second process.

6. The device of claim 5 comprising said wafer processing system, wherein said wafer processing system is a double-sided wafer scrubber.

7. The device of claim 5 wherein said data associated with a plurality of processes includes, for each process, a process descriptor, a process ID, and a process status.

8. A method of allowing all but a first station of a plurality of stations to continue processing wafers in a double-sided wafer scrubber, said double-sided wafer scrubber including a memory and a processor, said processor coupled in communications with said memory and said plurality of stations, said method comprising the steps of:

said processor executing a first process for controlling said first station;

said processor receiving a stop first station signal; and said processor stopping only said first station from further processing by said processor transmitting a stop signal to said first process, wherein said step of stopping said first station includes:

said processor accessing an ID of said first process;

said processor ceasing execution of said first process using said ID.

9. The method of claim 8 wherein said step of accessing said ID includes accessing a memory location in said memory including a copy of said ID.

10. The method of claim 9 wherein said step of ceasing execution of said first process using said ID includes:

said processor transmitting an interrupt signal to said first process;

said first process processing said interrupt signal; and exiting said first process.

11. The method of claim 10 wherein said step of processing said interrupt signal further includes:

said first process setting said ID to invalid; and said first process setting a first process status to busy.

12. A method of controlling a portion of a double-sided wafer scrubber, said double-sided wafer scrubber including a processor, a memory, a station and a second station, said processor being coupled in communications with said memory, said station and said second station, said processor for communicating control signals to said station and said second station, said memory for storing a program and data for use by said processor;

said processor executing a process controlling said station;

said processor executing a second process controlling said second station;

said processor receiving a signal to reset said station;

said processor resetting said process causing only said station to be reset.

13. The method of claim 12 wherein said step of resetting said process includes:

said processor ceasing execution of said process; and said processor starting a new process corresponding to said station.

14. The method of claim 13 wherein said step of starting a new process includes:

said processor executing a fork command, said fork command including a name of a module corresponding to said station.

15. The method of claim 13 wherein said step of resetting said process includes:

said processor saving a copy of an ID of said process in said memory;

said processor setting a status of said process to busy;

said processor transmitting a signal to said process;

said process setting said ID to invalid;

said process exiting;

said processor testing whether said ID is invalid; and if said ID is invalid, then performing the following steps, said processor communicating a kill signal to said process using said copy of said ID, said processor starting a new process corresponding to said station.

16. The method of claim 12 wherein said step of resetting said process includes:

said processor transmitting a kill signal to said process;

said process exiting responsive to receiving said kill signal; and said processor starting a new process corresponding to said station.

* * * * *